(12) United States Patent
James

(10) Patent No.: US 11,898,122 B1
(45) Date of Patent: Feb. 13, 2024

(54) BAR SOAP RECYCLING DEVICE

(71) Applicant: Alwin James, Laurel, MD (US)

(72) Inventor: Alwin James, Laurel, MD (US)

( * ) Notice: Subject to any disclaimer, the term of this patent is extended or adjusted under 35 U.S.C. 154(b) by 153 days.

(21) Appl. No.: 17/377,056

(22) Filed: Jul. 15, 2021

(51) Int. Cl.
  *C11D 13/30* (2006.01)
  *C11D 13/16* (2006.01)
  *C11D 13/12* (2006.01)
  *B29C 39/38* (2006.01)
  *B29B 13/02* (2006.01)

(52) U.S. Cl.
  CPC ............ *C11D 13/30* (2013.01); *B29B 13/022* (2013.01); *B29C 39/38* (2013.01); *C11D 13/12* (2013.01); *C11D 13/16* (2013.01)

(58) Field of Classification Search
  CPC ......... C11D 13/00; C11D 13/14; C11D 13/16; C11D 13/20; C11D 13/30; A21B 3/02; A47J 37/0623
  See application file for complete search history.

(56) References Cited

U.S. PATENT DOCUMENTS

| | | | | |
|---|---|---|---|---|
| 1,409,925 A * | 3/1922 | Calderwood | .......... | C11D 13/16 425/444 |
| 1,413,870 A * | 4/1922 | Paley | .......... | C11D 13/12 425/200 |
| 2,620,511 A * | 12/1952 | Marshall | .......... | C11D 13/18 510/447 |
| 2,987,484 A * | 6/1961 | Lundberg | .......... | C11D 1/12 510/491 |
| 3,168,642 A * | 2/1965 | Savio | .......... | F24C 15/325 219/400 |
| 3,548,146 A * | 12/1970 | Hoyland | .......... | A63H 33/3055 392/416 |
| 3,876,105 A * | 4/1975 | Kelling | .......... | B29B 13/022 118/202 |
| 4,030,867 A * | 6/1977 | Everman | .......... | C11D 13/30 219/421 |
| 4,035,122 A * | 7/1977 | Cavanaugh | .......... | C11D 13/14 425/84 |
| 4,181,613 A * | 1/1980 | Welsh | .......... | G01N 30/30 96/104 |
| 4,296,064 A * | 10/1981 | Satcher | .......... | C11D 13/14 510/447 |
| 4,344,529 A * | 8/1982 | Ibarzabal | .......... | A47K 5/02 425/409 |

(Continued)

*Primary Examiner* — Andrew D Graham
(74) *Attorney, Agent, or Firm* — Sanchelima & Associates, P.A.; Christian Sanchelima; Jesus Sanchelima

(57) ABSTRACT

A bar soap recycling device including an enclosure assembly, a tray assembly, an electrical assembly, and a soap assembly is disclosed. These assemblies in conjunction with one another provide a simple solution to recycling used bars of soap. Leftover chips, slivers, or pieces of used soap bars are placed within a mold of the tray assembly. The tray assembly is placed within an enclosure that includes an integrated heating element. The heating element warms the heat conducting mold to the point of melting the used soap bars. A timer determines when the soap bars have had enough time to melt into the shape of the mold. A cooling element in the form of a fan then cools the mold and soap contained therein to resolidify the used bars of soap into a single bar. The resolidified bar of soap is then removed from the mold and ready to be used.

10 Claims, 4 Drawing Sheets

(56) References Cited

U.S. PATENT DOCUMENTS

| | | | | |
|---|---|---|---|---|
| 4,578,246 A * | 3/1986 | Pope | .................. | B01J 4/001 |
| | | | | 422/111 |
| 4,781,564 A * | 11/1988 | Cerrone | .............. | B30B 15/0005 |
| | | | | 241/273.3 |
| 4,885,108 A * | 12/1989 | Richter | .................. | C11D 13/14 |
| | | | | 510/141 |
| 5,511,882 A * | 4/1996 | Anwunah | ................ | A47K 5/12 |
| | | | | 366/314 |
| 5,636,922 A * | 6/1997 | Clark | ................ | B05B 11/0002 |
| | | | | 366/314 |
| 5,674,824 A * | 10/1997 | Eschette | ................ | C11D 9/18 |
| | | | | 510/141 |
| 5,801,362 A * | 9/1998 | Pearlman | ................ | F24C 7/087 |
| | | | | 219/400 |
| 5,876,769 A * | 3/1999 | Dowden | ................ | C11D 13/30 |
| | | | | 425/398 |
| D411,212 S * | 6/1999 | Jones | .......................... | D15/135 |
| 5,968,390 A * | 10/1999 | Lister | ..................... | C11D 13/00 |
| | | | | 219/432 |
| 6,459,073 B1 * | 10/2002 | Berger | .................... | F27B 17/02 |
| | | | | 219/432 |
| D471,572 S * | 3/2003 | Cziraky | ........................ | D15/144 |
| 6,902,387 B2 * | 6/2005 | Cziraky | ................ | B43K 19/16 |
| | | | | 425/173 |
| 7,677,386 B1 * | 3/2010 | Kumar | .................... | A47K 5/03 |
| | | | | 206/77.1 |
| 8,303,203 B2 * | 11/2012 | Bahash | .............. | C11D 17/0047 |
| | | | | 510/148 |
| 8,529,239 B1 * | 9/2013 | Black, Jr. | .............. | B29B 13/022 |
| | | | | 425/436 RM |
| 9,162,378 B1 * | 10/2015 | Spell | ...................... | B29C 39/38 |
| D749,782 S * | 2/2016 | Dildy | ............................ | D28/99 |
| 9,631,166 B1 * | 4/2017 | Wallace | .................. | B29C 39/44 |
| 9,765,290 B2 * | 9/2017 | Welcome | ................ | C11D 13/30 |
| 9,844,304 B2 * | 12/2017 | McClendon | ......... | A47K 5/1217 |
| 9,924,830 B1 * | 3/2018 | Glucksman | ............. | A47J 36/00 |
| 10,286,580 B2 * | 5/2019 | Hinton | .................. | C11D 13/00 |
| 10,577,572 B2 * | 3/2020 | James | .................... | B29C 33/02 |
| 10,767,144 B2 * | 9/2020 | Green | .................... | C11D 13/16 |
| 10,995,307 B2 * | 5/2021 | Bantum | ................. | C11D 13/18 |
| 2003/0180411 A1 * | 9/2003 | Hasegawa | .............. | C11D 13/16 |
| | | | | 425/564 |
| 2004/0031782 A1 * | 2/2004 | Westfield | .............. | F24C 15/022 |
| | | | | 126/190 |
| 2004/0162225 A1 * | 8/2004 | Shimada | ................ | C11D 17/02 |
| | | | | 510/141 |
| 2007/0001090 A1 * | 1/2007 | Abbas | .................. | B29C 39/006 |
| | | | | 249/127 |
| 2007/0132148 A1 * | 6/2007 | Nakano | .................. | C11D 13/16 |
| | | | | 264/328.2 |
| 2009/0029891 A1 * | 1/2009 | Callahan | ................ | C11D 13/16 |
| | | | | 264/261 |
| 2009/0206110 A1 * | 8/2009 | Bianchini | ................ | A47K 5/12 |
| | | | | 222/181.3 |
| 2011/0127245 A1 * | 6/2011 | Burrus | .................. | C11D 13/30 |
| | | | | 219/201 |
| 2012/0071387 A1 * | 3/2012 | Aesch, Jr. | .............. | C11D 17/04 |
| | | | | 510/449 |
| 2012/0192479 A1 * | 8/2012 | Schmitz | .............. | A01M 1/2094 |
| | | | | 43/132.1 |
| 2015/0008620 A1 * | 1/2015 | Welcome | ................ | B29C 31/04 |
| | | | | 249/105 |
| 2015/0216368 A1 * | 8/2015 | McClendon | ........... | C11D 13/30 |
| | | | | 222/1 |
| 2015/0305093 A1 * | 10/2015 | Smith | ...................... | H05B 3/26 |
| | | | | 219/391 |
| 2015/0361384 A1 * | 12/2015 | Schaible | ................ | C11D 13/10 |
| | | | | 422/107 |
| 2017/0015957 A1 * | 1/2017 | Jones | ..................... | C11D 13/30 |
| 2017/0023257 A1 * | 1/2017 | Arnold, IV | .............. | A21B 5/00 |
| 2017/0114309 A1 * | 4/2017 | Hammond | ............. | C11D 13/14 |
| 2018/0162015 A1 * | 6/2018 | Hinton | .................. | C11D 13/00 |
| 2019/0059648 A1 * | 2/2019 | Chan | ..................... | F24C 15/02 |
| 2019/0085272 A1 * | 3/2019 | James | ............... | C11D 17/0047 |
| 2019/0186756 A1 * | 6/2019 | Tiefnig | .................. | F24C 15/16 |
| 2020/0070386 A1 * | 3/2020 | Green | .................... | C11D 13/12 |
| 2020/0190443 A1 * | 6/2020 | Bantum | ................. | C11D 13/18 |

* cited by examiner

BAR SOAP RECYCLING DEVICE

BACKGROUND OF THE INVENTION

1. Field of the Invention

The present invention relates to a bar soap recycling device and, more particularly, to a bar soap recycling device that reforms used soap bars through the use of an integral heating and cooling element.

2. Description of the Related Art

Several designs for bar soap recycling device have been designed in the past. None of them, however, include an integrated heating and cooling system.

Applicant believes that a related reference corresponds to U.S. Pat. No. 5,876,769 issued for a method and apparatus for forming a soap bar from remnants of used soap bars using a heated soap mold apparatus. Applicant believes another related reference corresponds to U.S. Pat. No. 9,765,290 issued for an apparatus and method for melting soap fragments to create a soap bar from the soap fragments. None of these references, however, teach of a bar soap recycling device that includes an integrated heating and cooling element.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a bar soap recycling device that includes an integrated heating element.

It is another object of this invention to provide a bar soap recycling device that includes a soap bar mold capable of retaining heat to melt left over soap bars.

It is still another object of the present invention to provide a bar soap recycling device that includes an integrated cooling element.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
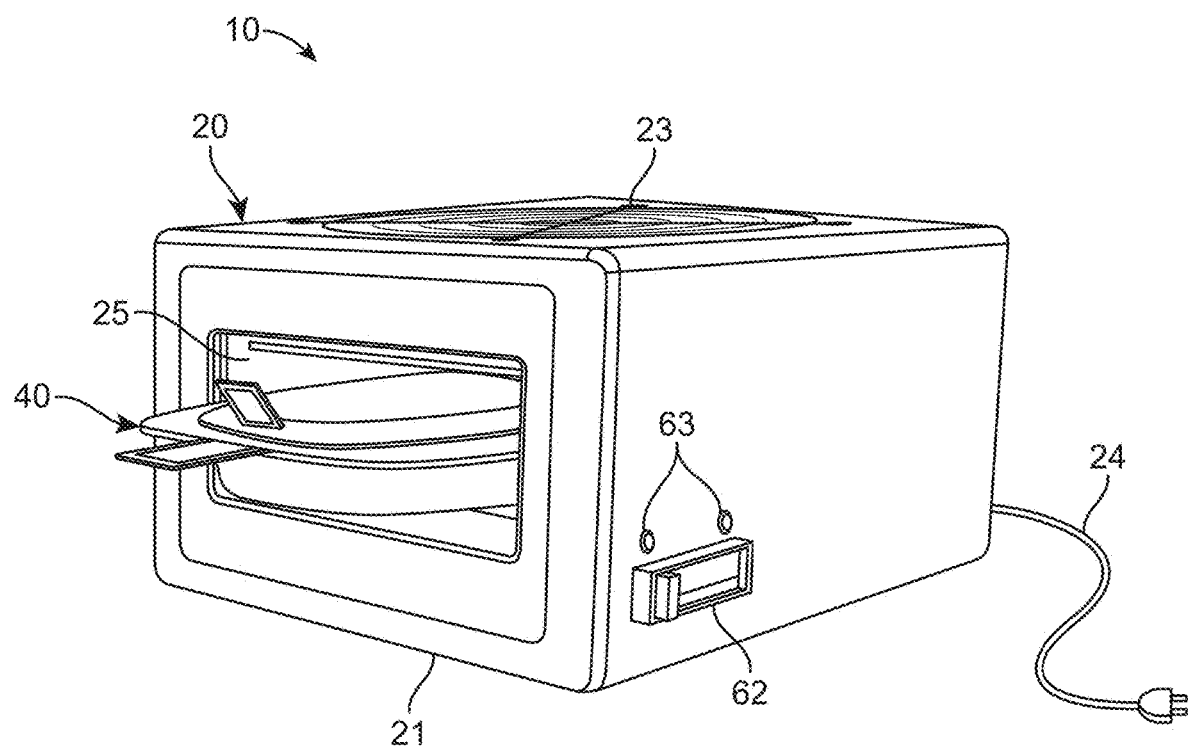
FIG. 1 represents an isometric view of enclosure assembly 20 as tray assembly is being inserted into cavity 25. Located at the top end of enclosure 21 is a vent 23 in the form of a circular grating to allow for the release of heat while the present invention is in operation.
Figure 2:
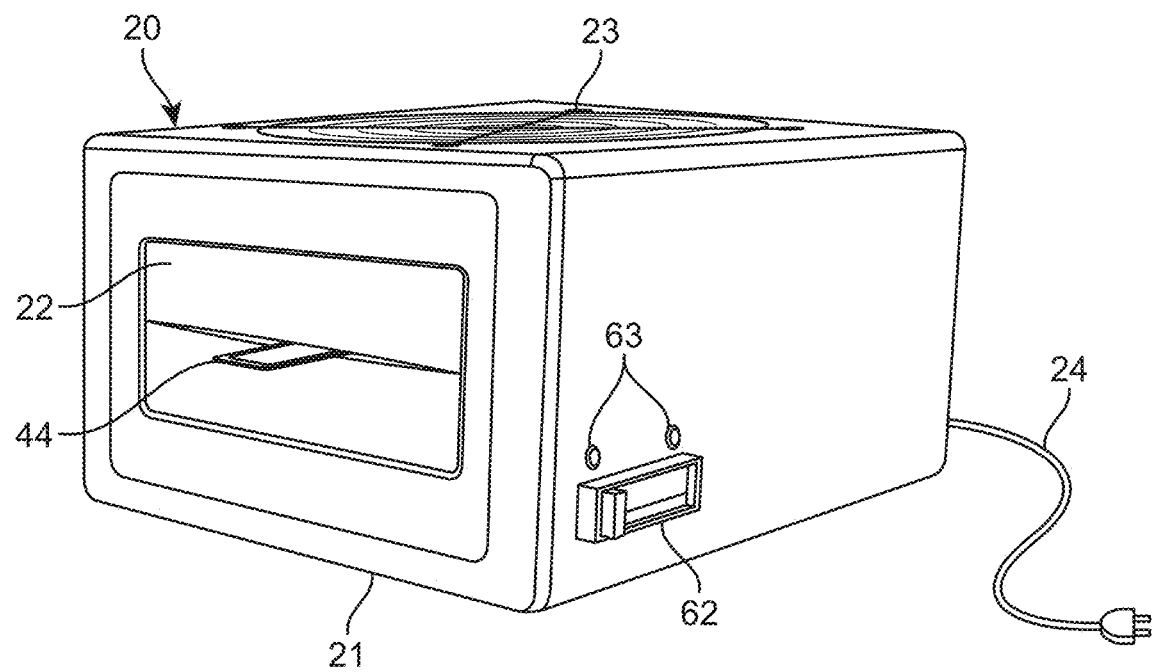
FIG. 2 shows an operational view of the front face of the enclosure 21 which includes doors 22 in a closed configuration. Wherein the doors 22 provide a user access to said cavity 25. It may be suitable for the doors 22 to be made of a heat resistant material to help retain heat within the enclosure 21 while the present invention is in operation.

Referring now to the drawings, where the present invention is generally referred to with numeral 10, it can be observed that it basically includes an enclosure assembly 20, a tray assembly 40, an electrical assembly 60, a soap assembly 80.

Best illustrated in FIG. 1 enclosure assembly 20 may include an enclosure 21. The enclosure 21 may be a hollow box including a cavity 25 therein. The enclosure 21 may include a top face with a vent 23. The vent 23 may be a circular grating for the release of heat from an interior of the enclosure 21 to an exterior. The enclosure 21 may further include a front face with doors 22. Wherein the doors 22 provide a user access to said cavity 25. It may be suitable for the doors 22 to be made of a heat resistant material. The enclosure 21 may include a rear face having a power cord extending therefrom.

Figure 3:
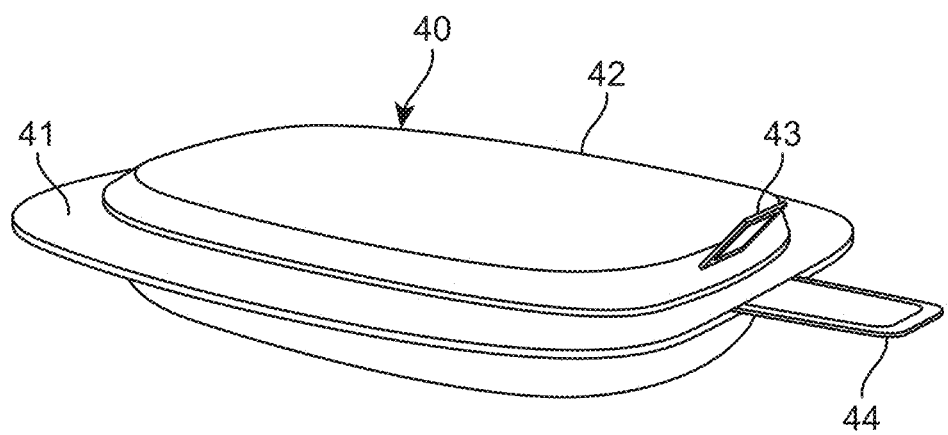
FIG. 3 illustrates tray assembly 40 including lid 42 in a closed configuration. The tray 41 including a flat rectangular member extending therefrom to form a handle 44. The tray 41 includes a hingedly mounted lid 42 thereon. The lid 42 has an oblong shape and closes over the top of tray 41. The lid 42 has a top portion that forms a flat surface and includes a lid tab 43 in the form of an additional flat rectangular member protruding therefrom. The lid tab 43 may be lifted by a user to gain access to an interior of the tray 41.
Figure 4:
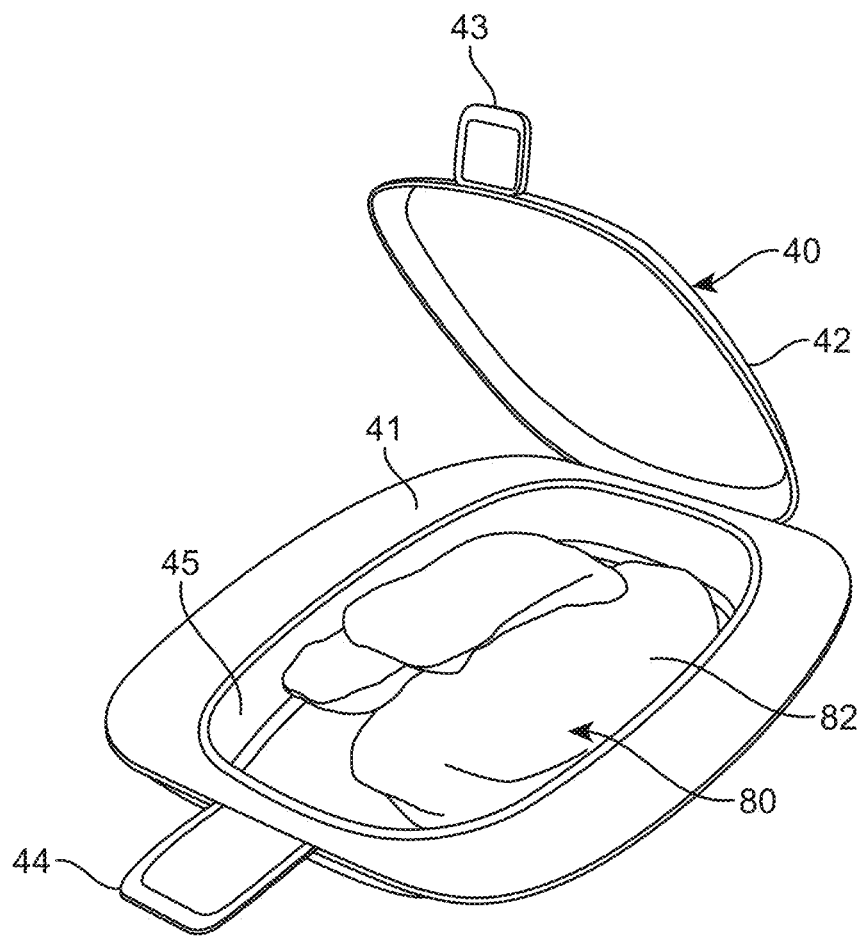
FIG. 4 is a representation of an internal view of tray 41 with used soap slivers 82 placed within the mold 45. The mold 45 is an oblong container that may be made of a heat conductive material to transfer heat to the soap slivers 82. The soap slivers 82 may be melted at this stage to take the shape of the mold 45.
Figure 5:
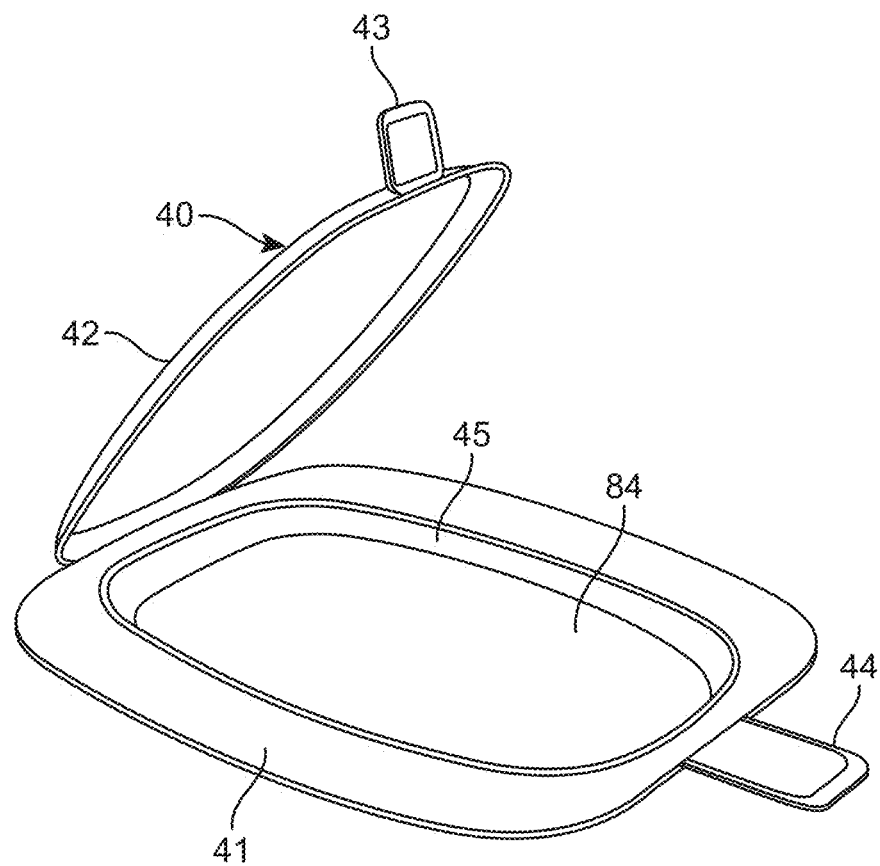
FIG. 5 depicts the finished product of solidified soap 84 within the mold 45 after the soap has been melted down and cooled. The solidified soap 84 is ready for reuse at this stage.

As shown in FIGS. 3-5 tray assembly 40 may include a mold 45. The mold may be an oblong container with a rounded bottom portion and an open top portion. It may be preferable for the mold 45 to be made of a metallic or other heat conductive material. The open top portion of the mold 45 may include a perpendicular protrusion extending circumferentially about a top edge forming a tray 41. The tray 41 may include a handle 44. The handle 44 may be a flat rectangular member extending from tray 41. The handle 44 may provide the user with a gripping point to easily insert and remove the tray assembly 40 within the enclosure 21. The tray 41 may further include a hingedly mounted lid 42 located opposite the handle 44. It may be suitable for the lid 42 to be oblong and close over the top edge of the open top portion of the mold 45. The lid 42 may include a top exterior portion having a flat surface. The lid 42 may include a lid tab 43. The lid tab 43 may be a flat rectangular member protruding from said lid 42. The lid tab 43 may provide a user access to the interior of mold 45.

Figure 6:
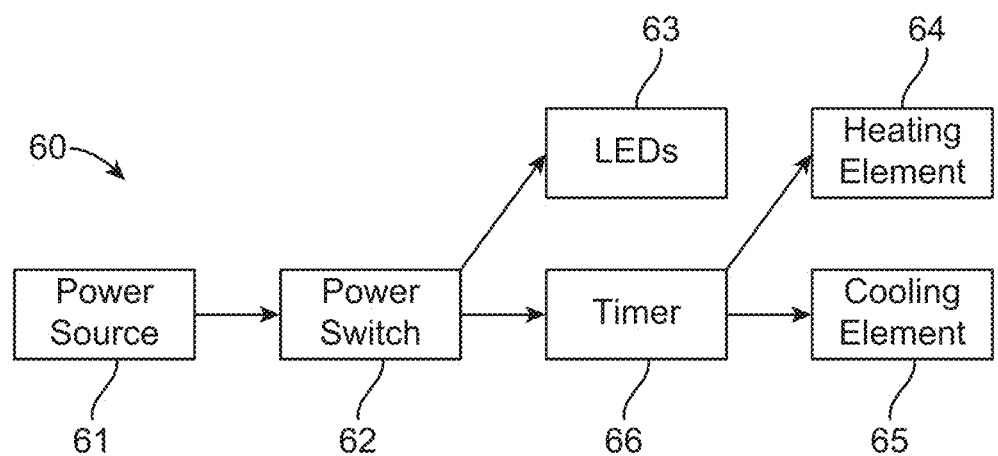
FIG. 6 portrays an electrical overview of electrical assembly 60. Wherein the power switch 62 is shown to communicate with a timer 66 that actuates the heating element 64 and the cooling element 65 for a predetermined amount of time to melt and solidify soap bars respectively.

Referring now to FIG. 6, electrical assembly 60 may include a power source 61. In one embodiment the power source 61 may be an electrical outlet providing power to the power switch 62 via a power cord 24. Alternatively power source 61 may be a rechargeable battery. The power switch 62 may be mounted to a lateral face of the enclosure 21. The power switch 62 may include an on and off position indicated by LEDs 63. The LEDs 63 may include a green light and a red light to indicate whether the present invention 10 is operation or not. When the power switch 62 is turned on a timer 66 may be actuated. The timer 66 may serve as a control for a heating element 64 and a cooling element 65. It may be suitable for the timer 66 to actuate the heating element 64 for a predetermined amount of time. Once the predetermined amount of time has elapsed it may be preferable for the cooling element 65 to be actuated for a secondary predetermined amount of time. The heating element 64 may be disposed along a bottom interior portion of the cavity 25. The cooling element 65 may be mounted to an interior top portion of enclosure 21 in alignment with vent 23. It may be preferable for the cooling element 65 to take the form of a fan.

Best depicted in FIG. 4 soap assembly 80 may include soap slivers 82. While the present invention 10 is in operation a user may place multiple soap slivers 82 within the mold 45. The lid 42 may then be closed over the mold 45. It may be suitable for the user to carry tray 41 by gripping handle 44 and place it within the cavity 25 of enclosure 21. It may be suitable for the doors 22 to close with the handle 44 remaining on the exterior of the enclosure 21. Thereby allowing a user to grasp the tray 41 without being in danger of burning themselves. The user, then activating the power switch 62, may begin the heating process of the mold 45 and the melting of the soap slivers 82 therein. After time has elapsed as determined by the timer 66 the heating element 64 may switch off and the cooling element 65 may actuate. In one embodiment the cooling element 65 may be a fan that removes heat from the interior of enclosure 21 to the exterior via a vent 23. When the tray 41 is cool enough to handle, the user may remove said tray 41 from the enclosure 21 and open lid 42 via a lid tab 43. The result of heating the soap slivers 82 and then cooling them may allow for the user to obtain a bar of solidified soap 84. Thereby reducing waste and cost associated with left over bars of soap that may have otherwise been thrown away.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a bar soap recycling device, comprising:
   a. an enclosure assembly including an enclosure having a cavity, said enclosure is a hollow box, wherein the enclosure includes an opening where doors located at a front face of said enclosure, the doors providing access to the cavity, said enclosure including a vent located at a top face, wherein said vent is a circular grating, said enclosure includes LEDs mounted thereon; and
   b. a tray assembly including a tray having a mold, wherein the tray includes a lid that closes in alignment over the mold, said mold is made of a heating conducting material; and
   c. an electrical assembly including a power source, a power switch, a heating element, and a cooling element aligned with said vent, said power source is an electrical outlet and/or a rechargeable battery, said heating element and said cooling element are actuated by a timer.

2. A system for a bar soap recycling device of claim 1 wherein said LEDs includes a green light and a red light to indicate whether said heating element and/or cooling elements is working or not.

3. A system for a bar soap recycling device of claim 1 wherein said tray includes a tray handle, said handle is a flat rectangular member extending from said tray.

4. A system for a bar soap recycling device of claim 1 wherein said lid includes a tray lid tab, said lid tab is a flat rectangular member protruding from said lid being opposite to said handle.

5. A system for a bar soap recycling device of claim 1 wherein said mold is an oblong container with a rounded bottom portion and a rounded top portion.

6. A system for a bar soap recycling device of claim 1 wherein said heating element is disposed about a bottom portion of the cavity, thereby a portion of said handle protrudes from said doors to be pulled out when placed on said heating element.

7. A system for a bar soap recycling device, comprising:
   a. an enclosure assembly including an enclosure having a cavity, said enclosure is a hollow box, wherein the enclosure includes an opening at a front face thereof where doors located, the doors providing access to the cavity, said enclosure including a vent located at a top face, the vent being a circular grating, said enclosure includes LEDs mounted thereon, said LEDs includes a green light and a red light to indicate whether said heating element and/or cooling elements is working or not; and
   b. a tray assembly including a tray having a mold, wherein the tray includes a lid that closes in alignment over the mold, said tray including a handle, the lid including a lid tab, said handle is a flat rectangular member extending from said tray, said mold is made of a heating conducting material; and
   c. an electrical assembly including a power source, a power switch, a heating element, and a cooling element, aligned with said vent, said power source is an electrical outlet and/or a rechargeable battery, said heating element and said cooling element are actuated by a timer.

8. A system for a bar soap recycling device of claim 1 wherein said tray includes a circumferential flange extending parallel with respect to a circumference thereof.

9. A system for a bar soap recycling device of claim 1 wherein said tray further includes a rim end around thereof, said lid includes a rim end that matches with said rim end of said tray to cover said bottom portion.

10. A system for a bar soap recycling device, consisting of:
    a. an enclosure assembly including an enclosure having a cavity, said enclosure is a hollow box, wherein the enclosure includes an opening at a front face thereof where doors, the doors providing access to the cavity, said enclosure including a vent located at a top face, the vent being a circular grating, said enclosure includes LEDs mounted thereon, said LEDs includes a green light and a red light to indicate whether said heating element and/or cooling elements is working or not; and
    b. a tray assembly including a tray having a mold, wherein the tray includes a lid that closes in alignment over the mold, said tray including a handle, the lid including a lid tab, said handle is a flat rectangular member extending from said tray, said mold is made of a heating conducting material, said lid tab is a flat rectangular member protruding from said lid being parallelly opposite to said handle, said mold is an oblong container with a rounded bottom portion and a rounded top portion; and c. an electrical assembly including a power source, a power switch, a heating element, and a cooling element, aligned with said vent, said power source is an electrical outlet and/or a rechargeable battery, said heating element and said cooling element are actuated by a timer, said heating element is disposed about a bottom portion of the cavity, thereby a portion of said handle protrudes from said doors to be pulled out when placed on said heating element, said power switch being entirely under the two LEDs.

\* \* \* \* \*